United States Patent
Chiocca et al.

(10) Patent No.: US 8,259,893 B2
(45) Date of Patent: Sep. 4, 2012

(54) DEVICE FOR CLEANING AND/OR SECURING A SAFE CONTAINMENT DEFINED IN A DEVICE FOR TRANSPORTING AND/OR STORING RADIOACTIVE MATERIALS

(75) Inventors: Rene Chiocca, Paris (FR); Daniel Chanson, La Chapelle sur Erdre (FR)

(73) Assignee: TN International, Montigny le Bretonneux (FR)

( * ) Notice: Subject to any disclaimer, the term of this patent is extended or adjusted under 35 U.S.C. 154(b) by 0 days.

(21) Appl. No.: 12/729,764

(22) Filed: Mar. 23, 2010

(65) Prior Publication Data

US 2010/0179367 A1    Jul. 15, 2010

Related U.S. Application Data

(62) Division of application No. 11/792,622, filed as application No. PCT/FR2005/050841 on Oct. 12, 2005, now abandoned.

(30) Foreign Application Priority Data

Dec. 7, 2004 (FR) ..................... 04 52884

(51) Int. Cl.
*G21C 19/00* (2006.01)
*G21C 9/00* (2006.01)
*G21F 5/00* (2006.01)
*G21F 1/00* (2006.01)

(52) U.S. Cl. ..... 376/272; 376/301; 376/300; 250/506.1; 250/507.1; 588/16

(58) Field of Classification Search ............ 376/272, 376/301, 300; 250/506.1, 507.1
See application file for complete search history.

(56) References Cited

U.S. PATENT DOCUMENTS

| 5,120,489 A | 6/1992 | Dillmann |
| 5,167,908 A | 12/1992 | Chakraborty |
| 5,464,988 A | 11/1995 | Rossmassler et al. |
| 6,524,534 B1 | 2/2003 | Tahara et al. |
| 2007/0297939 A1 | 12/2007 | Chiocca et al. |

FOREIGN PATENT DOCUMENTS

| DE | 2856243 A1 | 7/1980 |
| DE | 3716294 A1 | 12/1988 |
| DE | 4322499 A1 | 1/1995 |
| EP | 0660335 A | 6/1995 |
| EP | 0895250 A | 2/1999 |

OTHER PUBLICATIONS

International Search Report from International Application No. PCT/FR2005/050841, dated Mar. 22, 2006, 3 pages.

(Continued)

*Primary Examiner* — Erin M Leach
(74) *Attorney, Agent, or Firm* — Nixon Peabody LLP (57) ABSTRACT

A method for underwater packaging of radioactive materials includes creating a vacuum in a cavity of a cleaning device to automatically cause a portion of the cleaning device to move upward to actuate the cleaning device from an open position to a closed position; mounting the cleaning device inside a safe containment area of a transportation and/or storage device; placing the transportation and/or storage device in a pool after filling the safe containment area with water; loading a radioactive material into the safe containment area; closing the transportation and/or storage device using at least one cover; extracting the transportation and/or storage device from the pool; draining the water inside the safe containment area; and creating a pressure differential in the safe containment area to dry the safe containment area, wherein the pressure differential causes the cleaning device to automatically actuate from the closed position to the open position.

10 Claims, 5 Drawing Sheets

OTHER PUBLICATIONS

French Search Report in French Application No. FR 0452884, dated Apr. 5, 2005.
Office Action in U.S. Appl. No. 11/792,622, mailed Sep. 15, 2008.
Office Action in U.S. Appl. No. 11/792,622, mailed Nov. 4, 2008.
Office Action in U.S. Appl. No. 11/792,622, mailed May 19, 2009.
Office Action in U.S. Appl. No. 11/792,622, mailed Nov. 2, 2009.
Office Action in U.S. Appl. No. 11/792,622, mailed Dec. 15, 2010.

DEVICE FOR CLEANING AND/OR SECURING A SAFE CONTAINMENT DEFINED IN A DEVICE FOR TRANSPORTING AND/OR STORING RADIOACTIVE MATERIALS

STATEMENT OF RELATED APPLICATIONS

The present application is a divisional of co-pending U.S. patent application Ser. No. 11/792,622, filed Jun. 7, 2007, which is a national phase of International Application No. PCT/FR2005/050841 entitled "Device For Cleaning And/Or Securing A Containment Chamber Defined In A Device Used For The Transport And/Or Storage of Radioactive Materials", which was filed on Oct. 12, 2005, which was not published in English, and which claims priority of the French Patent Application No. 04 52884 filed Dec. 7, 2004.

TECHNICAL FIELD

This invention generally relates to the field of cleaning and/or securing a safe containment defined in a device for transporting and/or storing radioactive materials, such as, for example, nuclear fuel assemblies.

In such safe containments holding nuclear fuel assemblies, the high temperature promotes the conversion of oxides stable under ambient conditions into water, and the radiation emitted by the fuel assemblies cause some of this water to be converted by radiolysis into hydrogen and oxygen.

Thus, because the presence of hydrogen in the containment clearly jeopardizes the safety of the transportation and/or storage device assembly due to significant risks of flammability, explosiveness and pressure build-up that it creates, it is routinely attempted to remove this hydrogen.

To do this, the safe confinements can be equipped with a catalyst for recombining oxygen and hydrogen into water (or catalytic hydrogen recombiner), in contact with which the hydrogen combines with the oxygen present in the safe containment to form water according to the catalytic oxidation mechanism of hydrogen.

Naturally, the presence of water inside this containment also creates significant risks of corrosion, so that it may be necessary to clean the containment, in particular to remove the water, for example using a drying agent.

Of course, it is noted that damaging elements other than those cited above may be present in the containment, which may lead to the use of additional active means suitable for cleaning and/or securing this same safe containment.

The prior art includes a first document EP-A-0 660 335, in which active means for cleaning and/or securing the safe containment are contained in a sealed cavity insulated by a bursting membrane, of which the rupture is caused by the development of overpressure inside the safe containment.

An advantage related to this solution lies in the fact that the overpressure causing the burst of the membrane can occur only after the containment has been drained of borated water, meaning that the active means are therefore never in contact with the borated water capable of rendering them inoperative, temporarily or permanently. Nevertheless, this solution has a plurality of major disadvantages.

Indeed, it is first indicated that the active means enabling the safe containment to be cleaned and/or secured are only in contact with the environment of this containment by means of an opening corresponding to the burst membrane. Thus, significant convection currents cannot be produced around the active means, so that the overall efficacy of the latter remains relatively low.

In addition, when nuclear fuel assemblies are packaged, it is of course necessary to perform an additional pressurisation operation so as to generate a burst of the membrane, which is susceptible at this time of being broken and scattered in the safe containment.

The prior art also includes a second document EP-A-0 895 250, in which the safe containment is equipped with a residual moisture absorber with a molecular sieve, arranged vertically below a closable opening formed in a cover of the transportation and/or storage device. In addition, the size of this opening is such that it enables the residual moisture absorbent to be introduced into the safe containment, and removed therefrom.

Although this other solution also enables the risks associated with the incompatibility between the active means and the borated water of the pool inside the safe containment to be avoided when filling fuel assemblies, it is not entirely satisfactory, in particular doe to the fact that it is implemented after the final packaging of the cavity and necessitates an additional operation.

OVERVIEW

The invention therefore aims first to propose a device for cleaning and/or securing a safe containment defined in a device for transporting and/or storing radioactive materials such as nuclear fuel assemblies, which device at least partially overcomes the disadvantages mentioned above with regard to the devices of the prior art.

More specifically, the objective of the invention is to propose a device for cleaning and/or securing a safe containment which has satisfactory effectiveness, a simple design, and is capable of ensuring protection of the active means from the borated water in the safe containment during the loading of fuel assemblies.

In addition, the invention also aims to provide a device for transporting and/or storing radioactive materials such as nuclear fuel assemblies including at least one device for cleaning and/or securing, as well as a method for underwater packaging of radioactive materials also using at least one such device for cleaning and/or securing the safe containment.

To do this, the invention first relates to a device for cleaning and/or securing a safe containment defined in a device for transporting and/or storing radioactive materials such as nuclear fuel assemblies, which device includes active means capable of cleaning and/or securing the safe containment. According to the invention, this device also includes:

means forming a casing with an opening and defining a cavity; and means for closing the opening, capable of assuming an open position as well as a closed position in which they close this opening so as to seal the cavity in which the active means are located, which device is designed so that the closure means are capable of being held in the closed position by a pressure difference having a value greater than or equal to a predetermined value, between the inside and the outside of the cavity.

In other words, it should be understood that the device according to the invention is such that the active means can be enclosed in a sealed cavity by maintaining the closure means in the closed position, solely by applying a simple pressure difference between the inside and the outside of said cavity, preferably obtained by creating a vacuum therein resulting in a pressure inside the cavity that is lower than that outside said cavity.

Thus, in this closed state, the device can then be located in the safe containment even when the borated water is still present therein, without the risk of the active cleaning and/or securing means being rendered inoperative by said borated water.

In addition, in order for these active cleaning and/or securing means to satisfy their function in the safe containment which has previously been drained, and therefore emptied of its borated water, it is sufficient to eliminate the pressure difference having a value greater than or equal to the predetermined value, in order to cause the closure means of said cleaning and/or securing device to automatically switch from the closed position to the open position.

Indeed, it is naturally specified that when the closure means assume the open position, the open cavity then enables the active means to communicate directly with the atmosphere of the safe containment.

By way of indication, it is noted that the predetermined pressure difference value mentioned above is in particular based on the design of the device, and that it can, for example, correspond to a minimum value not only maintaining the closure of the opening of the cavity by the closure means, but also a satisfactory seal between the means forming a casing with an opening, and these same closure means.

In this regard, it is indicated that the predetermined value does not necessarily have to be set so as to cause an automatic movement of these closure means from the open position to the closed position, which manipulation can actually be performed manually by an operator, before the pressure difference between the inside and the outside of the cavity is applied, so as to enable this closed position to be maintained, and thus provide a containment for the active means.

In addition, it has been noted that the rupture from the pressure difference with a value greater than or equal to the predetermined value caused the closure means to automatically switch from the closed position to the open position. Thus, this rupture refers not necessarily to a total rupture from the pressure difference between the inside and the outside of the cavity, but to a decrease in this pressure difference to a value leading to the desired result, namely the automatic release of the opening of the cavity. Naturally, if, as was just described, the design of the device is such that the release of the opening can be achieved before the pressure difference between the inside and the outside of the cavity reaches zero, it is clear that this automatic release also occurs when the pressure difference is reversed, namely when the pressure outside the cavity is lower than the pressure inside the cavity.

The cleaning and/or securing device according to the invention was designed so that the open position of the closure means is achieved automatically during the operation of drying the safe containment following the draining operation, which drying operation is indeed performed by creating a depression in the containment, in which the pressure is reduced and approaches that of the cavity still under pressure.

Once the closure means are in open position, the active means are arranged in the core of the safe containment, which enables their efficacy to be enhanced with respect to that found in prior art document EP-A-0 660 335. In addition, as is clear from the above, its design and operation remain relatively simple, and the active cleaning and/or securing means are entirely protected from the borated water in which the device can be immersed in a closed configuration.

Finally, it is specified that another advantage lies in the fact that the design and operation of this device enable it to be easily refit.

The device can preferably be designed so that the closure means switch from the closed position to the open position automatically by means of gravity, after a rupture from the pressure difference having a value greater than or equal to the predetermined value.

Moreover, in this specific case, after the aforementioned automatic switch, the closure means are preferably maintained in the open position also by gravity.

According to another alternative, the device can be designed so that the closure means switch from the closed position to the open position automatically by way of elastic means inserted between the closure means and the means forming a casing, after a rupture from the pressure difference having a value greater than or equal to the predetermined value. However, in this specific case, it is clear that the automatic switch is triggered when the internal pressure is still lower than the external pressure. In addition, after the aforementioned automatic switch, the closure means are preferably maintained in the open position also by way of elastic means.

Of course, it is possible to envisage providing a device combining gravity and the elastic means so as to enable the switch from the closed position to the open position, without going beyond the scope of the invention.

The device preferably includes means enabling a depression to be created in the cavity.

Also preferably, the active means are mounted on the closure means so that when the latter assume the open position in which they are located at a distance from the opening, the active means are located at least partially outside the cavity.

Naturally, this particular arrangement enables the active means to have an increased overall efficacy in the safe containment.

The closure means preferably comprise holding means enabling said closure means to be maintained in the open position. In addition, the holding means comprise a pin capable of sliding inside a hollow cylinder secured to the means forming a casing with an opening, which pin has a shoulder located inside the hollow cylinder and capable of coming into contact with an abutment provided at one end of said hollow cylinder.

In such a configuration, the pin can be attached to a closure plug bearing the active means. Thus, during the switch from the closed position to the open position, the closure plug and the active means are moved simultaneously. Of course, this applies only when the means forming a casing remain stationary with respect to the containment and the closure means are moved with respect to these same means forming the casing during the automatic switch between the two positions, and not in the reverse case, which can also naturally be envisaged.

Also preferably, the active means are arranged in one or more cartridges, and can include a catalyst for recombining oxygen and hydrogen into water, as well as a drying agent. By way of illustration, these two elements can be combined and take the form of palladium deposited on alumina, enabling the catalysis as well as the required drying to be achieved simultaneously.

The invention also relates to a device for transporting and/or storing radioactive materials such as nuclear fuel assemblies, including at least one cleaning and/or securing device such as the one that has just been described, which device is located in the safe containment and the closure means assume the open position.

Finally, the invention also relates to a method for underwater packaging of radioactive materials such as nuclear fuel assemblies, including the following steps:

creating a vacuum in the cavity of a cleaning and/or securing device as described above, so that the closure means are maintained in the closed position;

mounting the cleaning and/or securing device inside the safe containment of a device for transporting and/or storing radioactive materials;

placing the transportation and/or storage device in a pool after filling the safe containment with water;

loading the radioactive materials into the safe containment;

closing the transportation and/or storage device using at least one cover;

extracting the transportation and/or storage device from the pool;

draining the water located inside the safe containment; and drying said safe containment by creating a depression in the latter, which depression is created so as to cause the closure means of the cleaning and/or securing device to automatically switch from the closed position to the open position.

Thus, as described above, it should be understood that there is a correlation between the value of the depression applied to obtain the vacuum and the closure of the cavity, and the value of the depression applied in the safe containment to cause the latter to dry out, which correlation is determined so that the pressure difference having a value greater than or equal to the predetermined value between the inside and the outside of the cavity, enabling the closure means to be maintained in the closed position, is sufficiently attenuated, or even reduced to zero or else reversed during the drying, so as to allow the closure means of the cleaning and/or securing device to automatically switch from the closed position to the open position.

By way of example, the value of the two depressions indicated above can be identical.

Other advantages and characteristics of the invention will appear in the non-limiting detailed description below.

BRIEF DESCRIPTION OF THE DRAWINGS

This description will be provided with regard to the appended drawings in which.

DETAILED DESCRIPTION OF PREFERRED EMBODIMENTS

Figure 1:
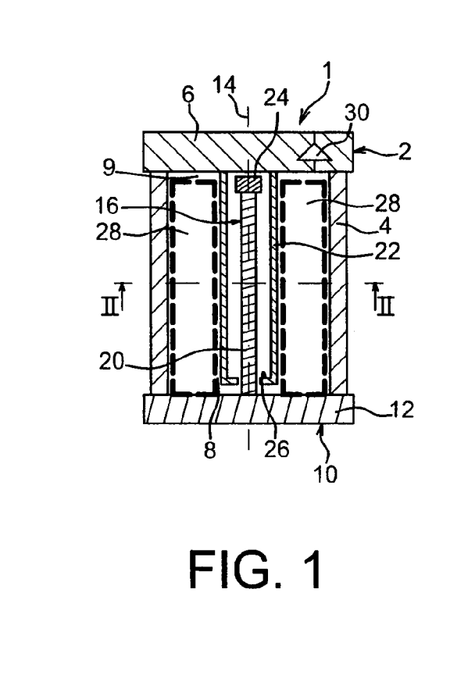
FIG. 1 shows a longitudinal cross-section view of a device for cleaning and/or securing a safe containment defined in a device for transporting and/or storing nuclear fuel assemblies, according to a preferred embodiment of the present invention, wherein means for closing this device are in a closed position.
Figure 2:
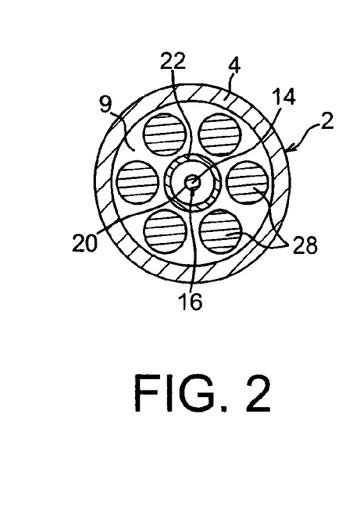
FIG. 2 shows a cross-section view along the line II-II of FIG. 1.
Figure 3:
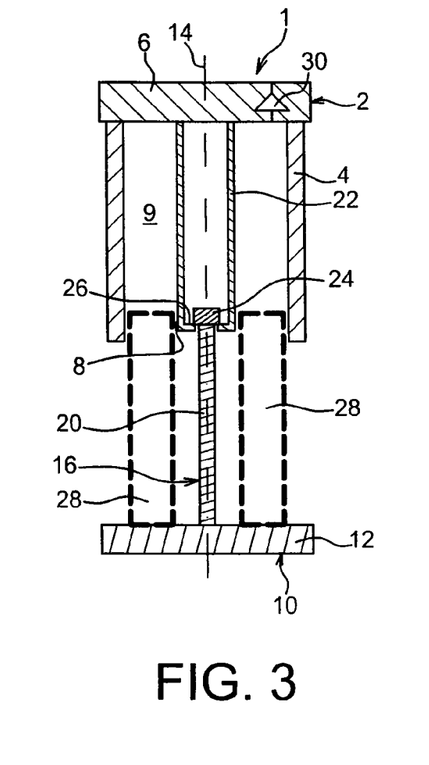
FIG. 3 shows a view similar to that shown in FIG. 1, with the means for closing the device in an open position.

First, FIGS. 1 to 3 show a device 1 for cleaning and/or securing a safe containment defined in a device (not shown in FIGS. 1 to 3) for transporting and/or storing radioactive materials such as nuclear fuel assemblies, according to a preferred embodiment of this invention.

The device 1 comprises means forming a casing 2 with an opening, which preferably have the shape of an annular body 4 closed at one of its two ends by a cover 6, and defining an opening 8 at the other of its ends. In addition, the annular body 4 defines a cavity 9 open only at the level of the opening 8.

In the following description of FIGS. 1 to 3, by convention, the cover 6 is considered to be at the level of a high end of the annular body 4, and the opening 8 is considered to be at the level of a low end of this same annular body.

The device 1 also includes means for closing 10 the opening, which means 10 primarily consist of a closure plug 12 oriented so as to be substantially perpendicular to a main longitudinal axis 14 of the means forming the casing 2. The plug 12 can be positioned so as to close the opening 8 as shown in FIG. 1, therefore showing the closure means 10 in a closed position, and can also be located at a distance from this same opening 8 as shown in FIG. 3 showing the closure means 10 in an open position.

Thus, the closure means 10 comprise holding means 16 enabling the closure means 10 to be maintained in the open position, which holding means 16 thus enable a mechanical link to be maintained between the closure plug 12 and the means forming the casing 2, when said plug 12 is located at a distance from the opening 8.

More specifically, the holding means 16 comprise a pin or solid cylinder 20 parallel to the main longitudinal axis 14 of the body 4, which pin 20 is capable of sliding into a hollow cylinder 22 also oriented according to the main longitudinal axis 14, and is secured to the cover 6 of the means forming the casing 2. Preferably, as is clearly visible in FIGS. 1 to 3, the pin 20 and the hollow cylinder are centred on the main longitudinal axis 14 of the body 4.

In this regard, the pin 20 bears the plug 12 at one of its ends as well as a shoulder 24 at the other of its ends, which shoulder 24 is located inside the hollow cylinder 22 and is capable of coming into contact with an abutment 26 provided at a low end of said cylinder 22.

In this way, as can be seen in FIG. 3, when the closure means 10 assume the open position, the closure plug 12 is maintained at a distance from the opening 8 and perpendicular to the main longitudinal axis 14 by the contact between the shoulder 24 and the abutment 26. In addition, as the abutment 26 of the hollow cylinder 22 is located near this opening 8, practically the entire pin projects downward when the closure means 10 assume the open position.

Also in reference to FIGS. 1 to 3, the device 1 has active means capable of cleaning and/or securing the safe containment, which active means are, for example, arranged in one or more cartridges 28, which are secured at one of their ends to the closure plug 12. By way of example, and as is best shown in FIG. 2, the cartridges 28 are preferably arranged parallel to the main longitudinal axis 14 around the pin 20 of the holding means 16, so as to be capable of being inserted into the cavity 9 when switching the closure means 10 from the open position to the closed position.

Thus, it can actually be seen that in the closure position of FIG. 1, the cartridges 28 are located between the annular body 4 and the hollow cylinder 22, in which annular cavity 9 the opening 8 is hermetically closed by the closure plug 12 secured to the low ends of these cartridges 28. However, in the open position shown in FIG. 3, the cartridges 28 project downward with respect to the annular body 4, and thus each have at least a portion located outside the cavity 9, intended to be arranged at the core of the safe containment to be cleaned and/or secured.

The active cleaning and/or securing means present in the cartridges 28 preferably include a catalyst for recombining oxygen and hydrogen into water as well as a drying agent, for the reasons mentioned above in the prior art section.

By way of example, the drying agent is selected from silica gel, molecular sieves, dehydrated complexing agents such as, for example, copper sulphate or hygroscopic chemical products such as calcium chloride, magnesium sulphate, or phosphorus pentoxide, possibly on a support material. The recombination catalyst is selected in particular from platinum- or palladium-coated catalysts. Also by way of preferred example, the active means can take the form of palladium deposited on alumina, enabling the catalysis and the required drying to take place simultaneously.

Naturally, these active means are determined and retained according to the nature of the elements to be removed inside the safe containment of the transportation and/or storage device, so as to clean and/or secure this same containment.

With device 1, when the closure means 10 assume the open position in which the closure plug 12 is held by gravity at a distance from the opening 8, the closure position can then be obtained by exerting a simple manual action so as to translate said plug 12 until it comes into contact with the annular body 4 and closes the opening 8 of the cavity 9.

Then, for this closure position to be maintained regardless of the orientation of the device 1 in space, and therefore so that the closure plug 12 does not release the opening 8 under the effect of gravity, a pressure difference having a value greater than or equal to a predetermined value is applied between the inside and the outside of the cavity 9.

The pressure difference mentioned above is achieved by creating a vacuum in the cavity 9, by means of an opening 30 provided for this purpose on the cover 6 of the means forming the casing 2, as well as using pumping means (not shown).

By way of example, the predetermined pressure difference value can, for example, be set at around 850 mbar, and is in every case maintained so that the contact between the closure plug 12 and the annular body 4 is impermeable, so that the active means arranged inside the cavity 9 are not disturbed by the external environment. Thus, the pressure difference having a value greater than or equal to the predetermined value can be obtained by creating a vacuum in the cavity 9 generating a pressure of around 150 mbar inside the latter.

In addition, when the device 1 is properly positioned, it is possible to automatically return to the open position of the closure means 10 by gravity by causing a change in the pressure difference having a value greater than or equal to the predetermined value on each side of the closure plug 12. Indeed, the creation of a depression in the means forming the casing 2, which are stationary with respect to the safe containment, results in a decrease in the pressure difference between the inside and the outside of the cavity 9, and causes the plug 12 as well as the cartridges 28 to automatically fall due to gravity, until they are held in the open position by the contact between the shoulder 24 and the abutment 26.

Figure 4:
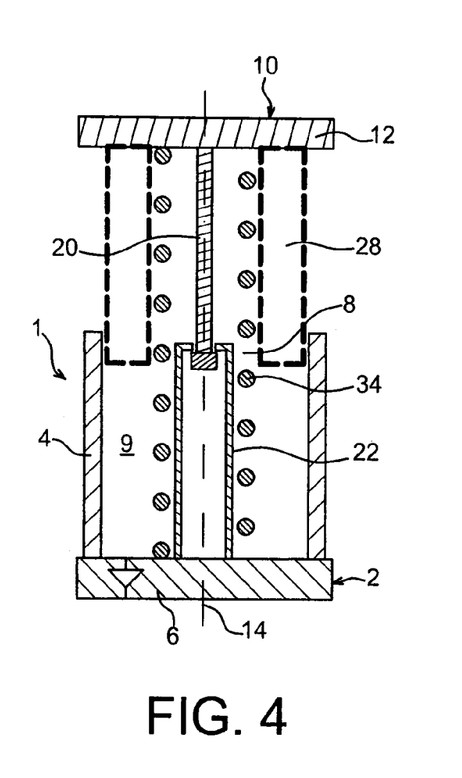
FIG. 4 shows a view similar to that shown in FIG. 3, in which the device is shown in an alternative form with respect to the preferred embodiment shown in FIGS. 1 to 3.

FIG. 4 shows the device 1 in an alternative form of the preferred embodiment described above in reference to FIGS. 1 to 3. Consequently, the elements with the same numeric references correspond to identical or similar elements.

Thus, it is indicated that the only difference between these two devices 1 lies in the fact that the one shown in the alternative form comprises elastic means inserted between the means forming a casing 2 and the closure means 10, which elastic means are designed so as to generate the automatic switch from the closed position to the open position, after a rupture from the pressure difference having a value greater than or equal to the predetermined value.

The elastic means preferably have the form of a simple compression spring 34 contacting an inner surface of the cover 6 as well as an inner surface of the closure plug 12, which spring 34 is, for example, located around the hollow cylinder 22.

With such an arrangement, as the automatic switch to the open position is no longer caused, at least exclusively, by gravity, but by way of elastic means, the device 1 is then advantageously capable of functioning satisfactorily regardless of the orientation of the latter inside the safe containment.

To show this, as can be seen in FIG. 4, the device 1 can indeed be in a turned-over position with respect to that of FIGS. 1 to 3, namely with the cover 6 at the level of a low end of the annular body 4, and with the opening 8 at the level of a high end of this same annular body. In this regard, it is noted that the elastic means also enable the closure means 10 to be maintained in the open position in which the cartridges 28 are located outside the cavity, and thus prevent these means 10 from falling due to gravity into the closed position.

Naturally, as mentioned above, the presence of elastic means indicates that the automatic switching of the closure means 10 is activated when the pressure difference on each side of the plug 12 is not yet zero, i.e. at a time when the pressure inside the cavity 9 is still lower than the pressure outside the latter.

FIGS. 5a to 5k show different steps of a method for underwater packaging of nuclear fuel assemblies, according to a preferred embodiment of this invention using one or more devices 1 such as that shown in FIGS. 1 to 3. Naturally, the packaging method could also be implemented using one or more devices 1 such as that shown in FIG. 4 in the open position, without going beyond the scope of the invention.

In addition, for reasons of clarity of the description, the method will hereinafter be considered to require the presence of only a single device 1 to clean and/or secure the safe containment.

Figure 5A:
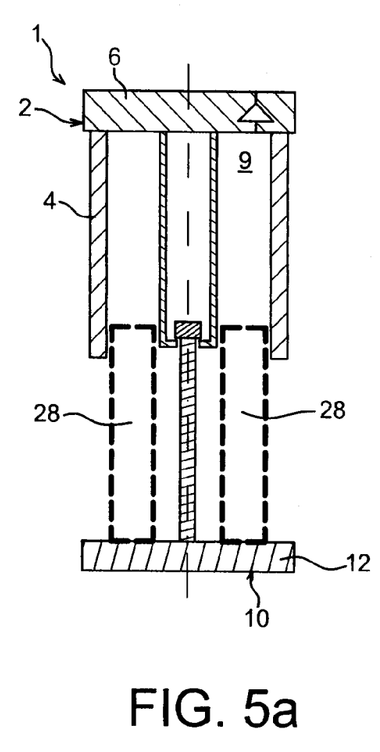
FIGS. 5a to 5k show various steps of a method for underwater packaging of nuclear fuel assemblies, according to a preferred embodiment of this invention.
Figure 5B:
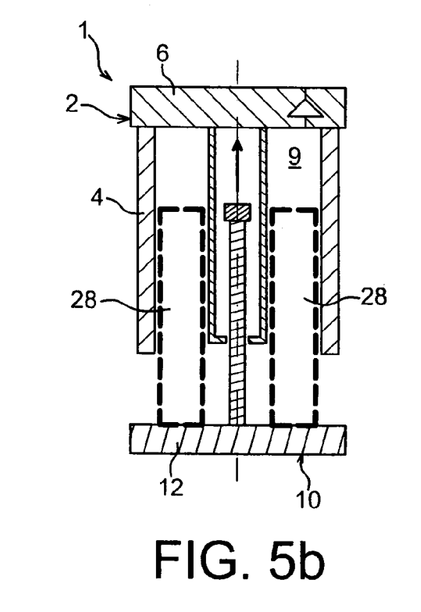
Figure 5C:
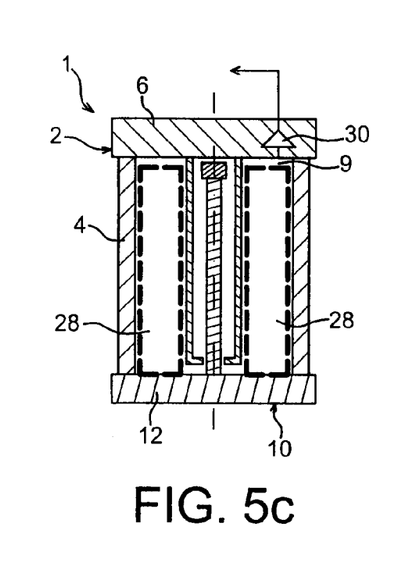

First, in reference to FIGS. 5a to 5c, the closure means 10 of the device 1 are placed manually from the open position to the closed position, then the cavity 9 is subjected to a vacuum by means of the opening 30, until the pressure difference on each side of the closure plug 12 is greater than or equal to the predetermined value, ensuring that the closure means 10 are locked in closed position, and that the active means are contained inside the cavity 9.

The device 1 can then be assembled inside the safe containment 102 of a device 100 for transporting and/or storing nuclear fuel assemblies to be packaged, before said device 100 is immersed in a pool. By way of example, the device 1 can be mounted on a storage bin 104 arranged inside the containment 102, on a container 106 laterally defining this same containment, or a cover 108 closing the latter.

In the description below, as is visible in the Figures, the device 1 is considered to be mounted on the bin 104.

Regardless of the choice made for mounting the device 1, as the opening after the latter is intended to occur automatically by way of gravity, the orientation of the device 1 inside the containment 102 is preferably that shown in FIGS. 1 to 3, namely with the closure plug 12 downward and the cover 6 upward, and the device 100 in a position in which it rests on its base (not shown). Of course, in such a case in which the main longitudinal axis 14 of the device 1 is intended to be parallel to a main longitudinal axis 103 of the device 100, it is therefore the means forming the casing 2 that are secured to the bin 104.

Figure 5D:
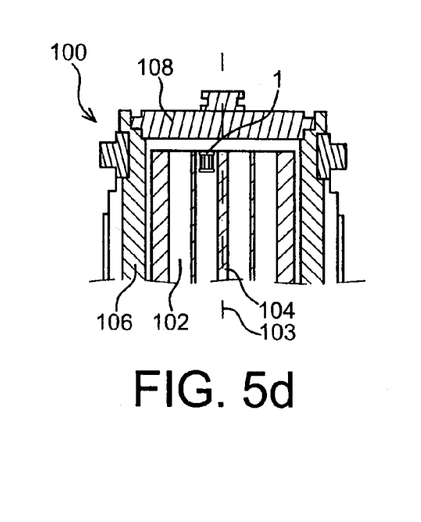
Figure 5E:
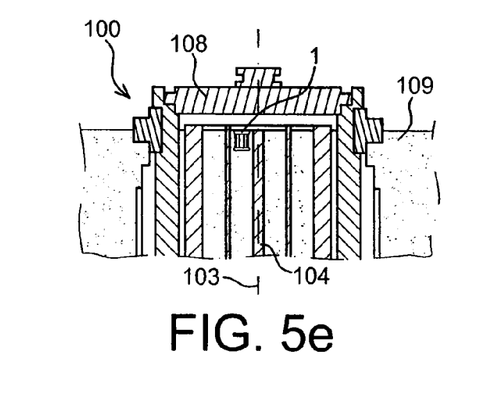

Once the device 1 is assembled, the cover(s) 108 of the device 100 are mounted on the container 106 as shown in FIG. 5d, and the transportation and/or storage device assembly 100 can then be immersed in a pool 109 as shown diagrammatically in FIG. 5e, after the safe containment 102 has been filled with water.

Figure 5F:
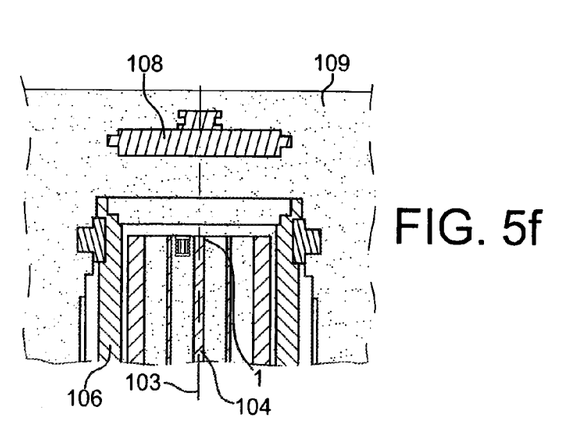
Figure 5G:
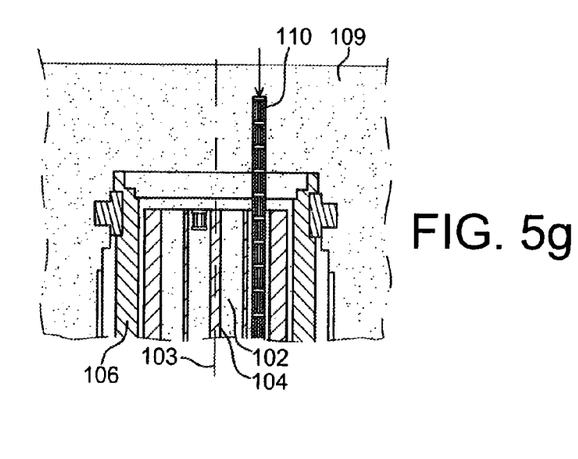

In FIG. 5f, it can be seen that the cover(s) 108 are again removed so as to enable the nuclear fuel assemblies 110 to be loaded into the safe containment 102, in the storage bin 104 holding the device 1, as is clear from FIG. 5g.

Figure 5H:
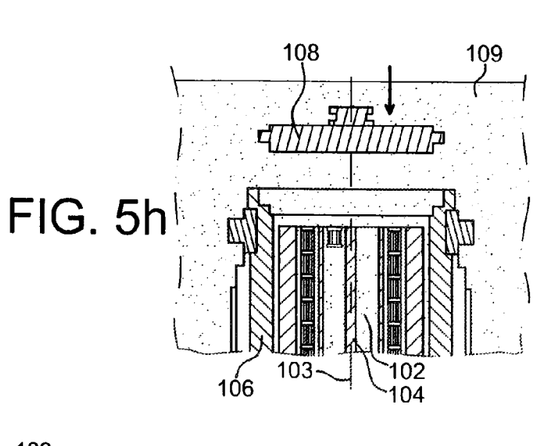

Then, when the loading of the assemblies 110 has been completed, the container 106 is again closed using the cover(s) 108 as shown in FIG. 5*h*, with the device 1 still located integrally in the pool 109, and the cleaning and/or securing device 1 still in its closed configuration protecting the active means from the borated water present in the pool 109.

Figure 5I:
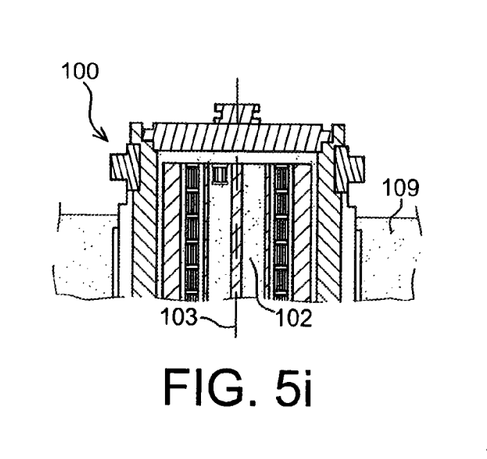

The device 100, of which the safe containment 102 is now hermetically closed and filled with water, is then moved so as to be extracted from the pool 109, as shown diagrammatically in FIG. 5*i*.

Next, a step of draining the water located inside the safe containment 102 is performed in a manner known to a person skilled in the art.

Also in a known manner, a step of drying this same safe containment 102 is then performed, by creating a depression in the latter, for example, by means of an opening (not shown) provided for this purpose in the cover 108.

The special feature of the packaging method lies in the fact that the depression created during the drying is performed so as to simultaneously cause the closure means 10 of the device 1 to automatically switch from the closed position to the open position.

Indeed, the value of the depression applied inside the cavity 9 to obtain the vacuum thereof and the value of the depression applied in the safe containment 102 to ensure that it dries are set on the basis of one another so that during the drying, the pressure difference between the inside and the outside of this cavity 9 is sufficiently attenuated to cause the aforementioned automatic switch, by means of gravity.

By way of example, the two aforementioned depression values are each set at around 150 mbar.

Figure 5J:
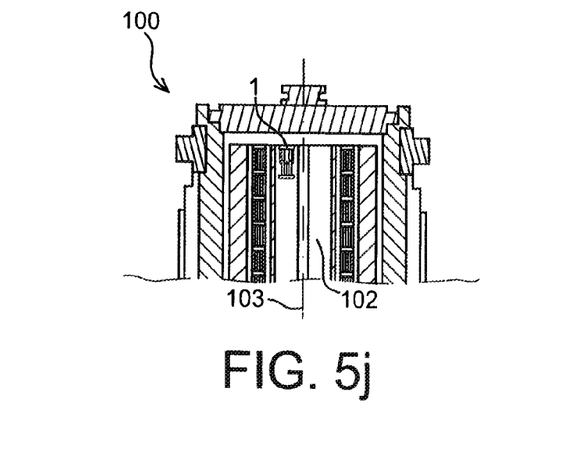
Figure 5K:
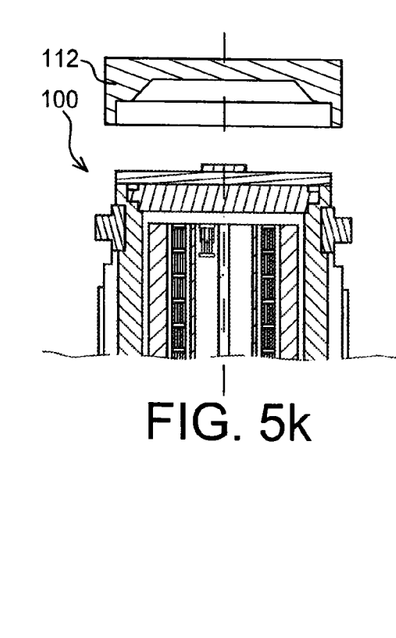

Thus, as shown in FIG. 5*j*, the device 100 has a safe containment 102 equipped with a cleaning and/or securing device 1 in an open configuration, i.e. in a configuration in which the active means are directly in contact with the atmosphere of said containment 102.

To conclude, the method can comprise standard steps such as exposing the safe containment 102, or the protective cover installation 112 at the upper and lower ends of the device 100, to inert gas, such as helium.

It is noted that the invention also relates to a device 100 for transporting and/or storing radioactive materials, such as that shown in FIG. 5*j* in which the device 1 includes closure means in the open position.

Finally, it is noted by way of indication that, in the case of wet transport of nuclear fuel assemblies, the device 1 is assembled inside the safe containment so as to always be located in the gaseous portion of the latter and not in the liquid portion thereof, naturally so as to preserve the efficacy of the active cleaning and/or securing means. Obviously, this constraint does not apply in the case of dry transport.

Various modifications can of course be made by a person skilled in the art to the devices 1, 100 and to the packaging method described above solely by way of non-limiting examples. In this regard, it is noted that the invention applies not only to nuclear fuel assemblies as presented above, but also to any other type of radioactive material.

What is claimed is:

1. A method for packaging of radioactive materials using a pool, a transportation and/or storage device having a safe containment area, a cleaning device having a cavity and a portion movable between an open position and a closed position, the cavity containing an activating agent therein, the method comprising:
creating a vacuum in the cavity of a cleaning device to cause the portion of the cleaning device to be maintained in a closed position; mounting the cleaning device inside the safe containment area of the transportation and/or storage device; filling the safe containment area with water; placing the transportation and/or storage device in the pool;
loading a radioactive material into the safe containment area;
closing the transportation and/or storage device using at least one cover;
extracting the transportation and/or storage device from the pool;
draining the water inside the safe containment area;
creating a pressure differential in the safe containment area to dry the safe containment area, wherein the pressure differential causes the cleaning device to automatically actuate from the closed position to the open position under the force of gravity; and
exposing the activating agent to the safe containment area.

2. The method of claim 1, wherein the portion of the cleaning device moves automatically downward from the closed position to the open position when the pressure differential is at a value equal to or greater than a predetermined value.

3. The method of claim 1, wherein the portion of the cleaning device further comprises a first casing, the first casing positioned within a second casing of the cleaning device, the first casing coaxial with the second casing with respect to a longitudinal axis, wherein the first casing and the second casing are positioned to substantially overlap one another vertically when the cleaning device is in the closed position, the first casing at least partially positioned vertically below the second casing along the longitudinal axis when the cleaning device is in the open position.

4. The method of claim 3, wherein a holding device positioned between the first casing and the second casing maintains the first casing below the second casing a predetermined distance when the cleaning device is in the open position.

5. The method of claim 4, wherein the holding device further comprises a pin which slides within a hollow cylinder oriented along the central axis within the cleaning device, the pin having a shoulder which comes into contact with an abutment in the hollow cylinder to maintain the first casing at the predetermined distance below the second casing when the cleaning device is in the open position.

6. The method of claim 3, wherein a spring is coupled to the first and second casings and urge the cleaning device toward the closed position, wherein the spring forces the first casing to automatically move downward along the longitudinal axis from the closed position to the open position when the pressure differential is of a value equal to or greater than a predetermined value.

7. The method of claim 3, wherein the activating agent is positioned to move vertically downward with the first casing along the longitudinal axis.

8. The method of claim 7, wherein the first casing includes a closure plug with a cartridge arranged thereon; the activating agent is arranged in the cartridge and is not exposed to the safe containment area when the cleaning device is in the closed position.

9. The method of claim 7, wherein the activating agent includes a catalyst for recombining oxygen and hydrogen into water and a drying agent.

10. The method of claim 1, wherein the activating agent includes a catalyst for recombining oxygen and hydrogen into water and a drying agent.

\* \* \* \* \*